US008684037B2

(12) United States Patent
Huynh

(10) Patent No.: US 8,684,037 B2
(45) Date of Patent: Apr. 1, 2014

(54) PROPORTIONAL POPPET VALVE WITH INTEGRAL CHECK VALVE

(75) Inventor: Tam C. Huynh, Richfield, MN (US)

(73) Assignee: Eaton Corportion, Cleveland, OH (US)

(*) Notice: Subject to any disclaimer, the term of this patent is extended or adjusted under 35 U.S.C. 154(b) by 565 days.

(21) Appl. No.: 12/536,190

(22) Filed: Aug. 5, 2009

(65) Prior Publication Data

US 2011/0030818 A1 Feb. 10, 2011

(51) Int. Cl.
*F16K 11/078* (2006.01)

(52) U.S. Cl.
USPC ........................ 137/625.4; 251/30.04; 91/461

(58) Field of Classification Search
USPC ........................ 251/28–34; 137/625.4; 91/461
See application file for complete search history.

(56) References Cited

U.S. PATENT DOCUMENTS

| | | | | | |
|---|---|---|---|---|---|
| 2,480,712 | A | * | 8/1949 | Carbon | 251/34 |
| 3,024,801 | A | | 3/1962 | Carls | |
| 3,189,046 | A | | 6/1965 | Callahan et al. | |
| 3,593,541 | A | | 7/1971 | Odenthal et al. | |
| 3,862,738 | A | * | 1/1975 | Stumpmeier | 251/43 |
| 4,149,565 | A | * | 4/1979 | Jennings et al. | 137/885 |
| 4,311,296 | A | * | 1/1982 | Scheffel | 251/29 |
| 4,340,086 | A | | 7/1982 | Hemm et al. | |
| 4,478,245 | A | | 10/1984 | Bender | |
| 4,585,206 | A | | 4/1986 | Itoh | |
| RE32,644 | E | | 4/1988 | Brundage et al. | |
| 4,779,836 | A | | 10/1988 | Marklund | |
| 4,813,447 | A | | 3/1989 | Ichiryu et al. | |
| 4,848,721 | A | | 7/1989 | Chudakov | |
| 4,905,959 | A | | 3/1990 | Andersson | |
| 4,958,553 | A | * | 9/1990 | Ueno | 91/447 |
| 5,036,877 | A | | 8/1991 | Distler et al. | |
| 5,072,752 | A | | 12/1991 | Kolchinsky | |
| 5,097,746 | A | * | 3/1992 | Asaoka et al. | 91/461 |
| 5,101,858 | A | * | 4/1992 | Klotz | 137/605 |
| 5,137,254 | A | | 8/1992 | Aardema et al. | |
| 5,170,692 | A | | 12/1992 | Lonnemo | |
| 5,174,544 | A | * | 12/1992 | Emanie | 251/30.01 |
| 5,207,059 | A | | 5/1993 | Schexnayder | |
| 5,400,816 | A | * | 3/1995 | Gerstenberger | 137/106 |
| 5,421,545 | A | | 6/1995 | Schexnayder | |
| 5,568,759 | A | * | 10/1996 | Aardema | 91/461 |

(Continued)

FOREIGN PATENT DOCUMENTS

| | | |
|---|---|---|
| JP | 2000337304 | 12/2000 |
| WO | WO 00/73665 A1 | 12/2000 |

OTHER PUBLICATIONS

International Search Report and Written Opinion mailed Feb. 17, 2011.

(Continued)

*Primary Examiner* — Craig Schneider
*Assistant Examiner* — Matthew W Jellett
(74) *Attorney, Agent, or Firm* — Merchant & Gould P.C.

(57) ABSTRACT

A poppet valve assembly includes a body having a first axial end portion and a second axial end portion. The first axial end portion includes a tapered surface adapted for sealing engagement with a valve seat. The second axial end portion defines a metering orifice. The body defines a passage that includes an opening in the first axial end portion and is in fluid communication with the metering orifice. The passage includes a check valve seat. A check valve is disposed in the passage. The check valve is adapted to sealingly engage the check valve seat.

24 Claims, 7 Drawing Sheets

(56) References Cited

U.S. PATENT DOCUMENTS

| | | | | | |
|---|---|---|---|---|---|
| 5,645,263 | A * | 7/1997 | Aardema | .................. | 251/30.02 |
| 6,038,957 | A | 3/2000 | Ertmann et al. | | |
| 6,047,944 | A | 4/2000 | Hajek, Jr. | | |
| 6,073,444 | A | 6/2000 | Horton et al. | | |
| 6,089,528 | A | 7/2000 | Hajek, Jr. et al. | | |
| 6,109,284 | A * | 8/2000 | Johnson et al. | .................. | 137/1 |
| 6,131,606 | A | 10/2000 | O'Neill | | |
| 6,206,044 | B1 | 3/2001 | Gluf, Jr. | | |
| 6,293,180 | B1 * | 9/2001 | Morisako et al. | ............... | 91/420 |
| 6,296,015 | B1 * | 10/2001 | Morisako et al. | ........ | 137/601.19 |
| 6,557,822 | B1 | 5/2003 | Yoshino | | |
| 6,682,316 | B1 | 1/2004 | Böke | | |
| 6,691,510 | B2 | 2/2004 | Kariya et al. | | |
| 7,028,708 | B1 | 4/2006 | Langenfeld et al. | | |
| 7,258,134 | B1 | 8/2007 | Langenfeld et al. | | |
| 7,621,211 | B2 | 11/2009 | Ma et al. | | |
| 7,793,912 | B2 * | 9/2010 | Andoh | ...................... | 251/30.01 |
| 7,931,112 | B2 * | 4/2011 | Gehlhoff | ...................... | 180/417 |
| 2002/0157529 | A1 * | 10/2002 | Kariya et al. | .................. | 91/461 |
| 2004/0195532 | A1 * | 10/2004 | Barber et al. | ............. | 251/30.02 |
| 2005/0242310 | A1 | 11/2005 | Takiguchi et al. | | |
| 2006/0248883 | A1 * | 11/2006 | Gehlhoff | ........................ | 60/469 |
| 2007/0290152 | A1 | 12/2007 | Ma et al. | | |
| 2009/0050222 | A1 | 2/2009 | Jackson et al. | | |
| 2009/0218161 | A1 * | 9/2009 | Cadman et al. | .............. | 180/441 |
| 2010/0155633 | A1 | 6/2010 | Pfaff | | |
| 2013/0014837 | A1 | 1/2013 | Huynh | | |

OTHER PUBLICATIONS

EPV16 Series Valvistor Proportional Flow Controls, Eaton Corporation, Oct. 1999, 16 pages.

* cited by examiner

PROPORTIONAL POPPET VALVE WITH INTEGRAL CHECK VALVE

BACKGROUND

Valve assemblies are used in various applications including off-highway agriculture and construction equipment (e.g., wheel loaders, skid steers, combines, etc.). In some applications, valve assemblies are used to control the amount of fluid provided to implements such as buckets or booms. It is desired to have a valve assembly that is capable of some degree of load holding such that the implements can hold a load (e.g., extended boom, load in a bucket, etc.) for an extended period of time.

SUMMARY

An aspect of the present disclosure relates to a poppet valve assembly. The poppet valve assembly includes a body having a first axial end portion and a second axial end portion. The first axial end portion includes a tapered surface adapted for sealing engagement with a valve seat. The second axial end portion defines a metering orifice. The body defines a passage that includes an opening in the first axial end portion and is in fluid communication with the metering orifice. The passage includes a check valve seat. A check valve is disposed in the passage. The check valve is adapted to sealingly engage the check valve seat.

Another aspect of the present disclosure relates to a valve assembly. The valve assembly includes a main stage valve assembly. The main stage valve assembly includes a housing that defines a first fluid passage, a second fluid passage, a valve bore and a load holding cavity. The valve bore includes a valve seat. The valve bore is in fluid communication with the first and second fluid passages. The valve seat is disposed between the first and second fluid passages. The load holding cavity is in selective fluid communication with the second fluid passage. The main stage valve assembly further includes a poppet valve assembly disposed in the valve bore. The poppet valve assembly includes a poppet valve that is adapted for engagement with the valve seat. The poppet valve has a body defining a passage through the body. The passage includes a check valve seat and provides fluid communication between the first fluid passage and the load holding cavity. A check valve is disposed in the passage of the poppet valve. The check valve is adapted to reduce leakage through the passage in a direction from the load holding cavity to the first fluid passage.

Another aspect of the present disclosure relates to a valve assembly. The valve assembly includes a pilot stage valve assembly, a middle stage valve assembly in fluid communication with the pilot stage valve assembly and a main stage valve assembly in fluid communication with the middle stage valve assembly. The main stage valve assembly includes a housing that defines an inlet fluid passage, an outlet fluid passage, a valve bore and a load holding cavity. The valve bore includes a valve seat. The valve bore is in fluid communication with the inlet and outlet fluid passages. The valve seat is disposed in the valve bore between the inlet and outlet fluid passages. The middle stage valve assembly provides fluid communication between the load holding cavity and the outlet fluid passage. The main stage valve assembly further includes a poppet valve assembly disposed in the valve bore. The poppet valve assembly includes a poppet valve that is adapted for engagement with the valve seat. The poppet valve has a body defining a passage through the body. The passage includes a check valve seat and provides fluid communication between the inlet fluid passage and the load holding cavity. A check valve is disposed in the passage of the poppet valve. The check valve is adapted to reduce leakage through the passage in a direction from the load holding cavity to the inlet fluid passage.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
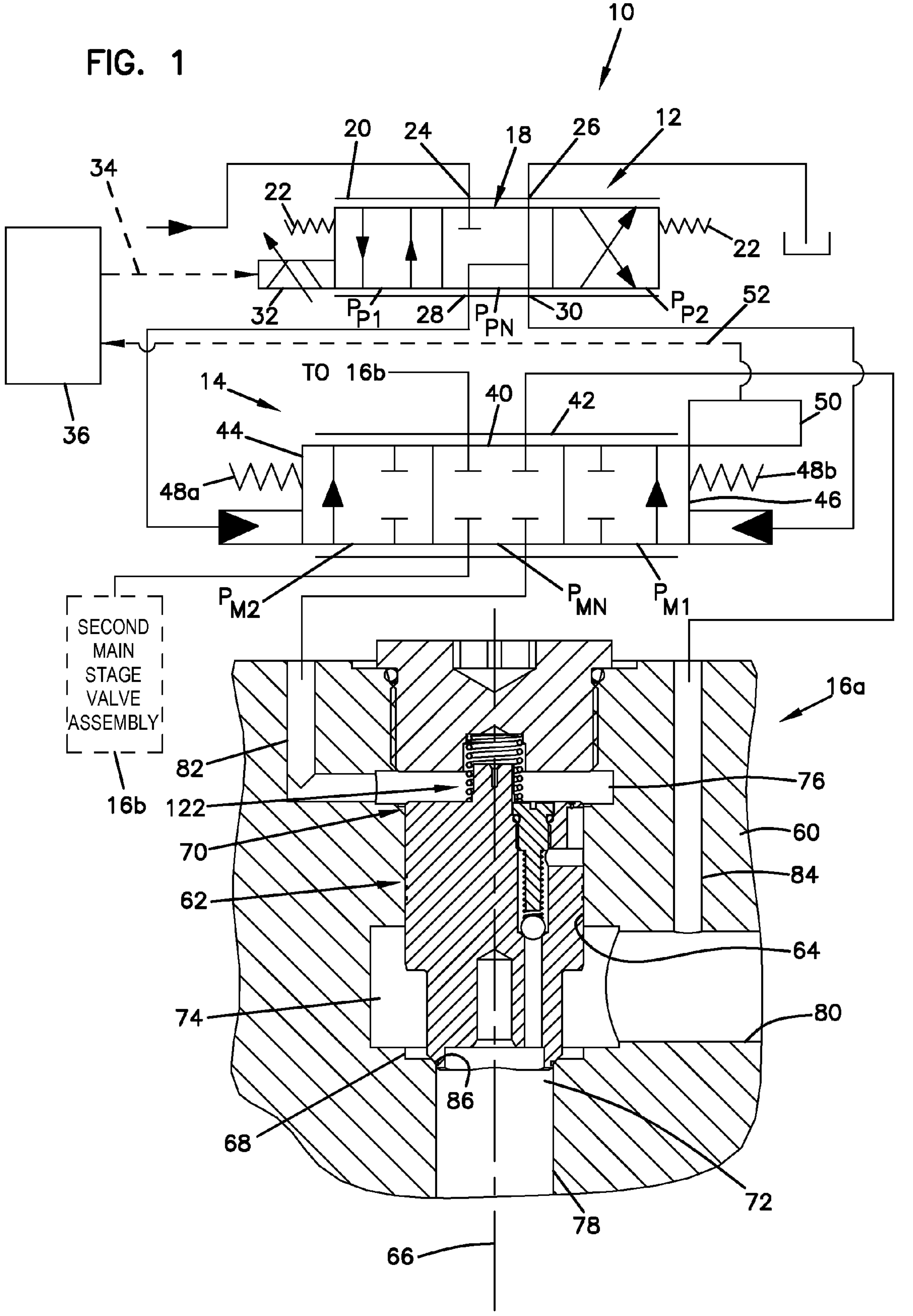
FIG. 1 is a schematic representation of a valve assembly having exemplary features of aspects in accordance with the principles of the present disclosure.

Referring now to FIG. 1, a valve assembly, generally designated 10, is shown. In one aspect of the present disclosure, the valve assembly 10 includes three stages: a pilot stage valve assembly 12, a middle stage valve assembly 14 and a first main stage valve assembly 16*a*.

In one aspect of the present disclosure, the pilot stage valve assembly 12 is a proportional valve that includes a pilot stage spool valve 18 and a housing 20. The pilot stage spool valve 18 is disposed in a bore of the housing 20 such that the pilot stage spool valve 18 is axially slidable in the bore of the housing 20.

The pilot stage valve assembly 12 further includes a plurality of centering springs 22. The plurality of centering springs 22 is adapted to center the pilot stage spool valve 18 in the bore of the housing 20.

In one aspect of the present disclosure, the pilot stage valve assembly 12 is a four-way valve. The pilot stage valve assembly 12 includes a fluid inlet port 24, a fluid return port 26, a first control port 28 and a second control port 30. In another aspect of the present disclosure, the pilot stage valve assembly 12 is a three-position valve. The pilot stage valve assembly 12 includes a neutral position $P_{PN}$, a first position $P_{P1}$ and a second position $P_{P2}$.

In the neutral position $P_{PN}$, the first and second control ports 28, 30 are in fluid communication with the fluid return port 26. In the first position $P_{P1}$, the first control port 28 is in fluid communication with the fluid inlet port 24 while the second control port 30 is in fluid communication with the fluid return port 26. In the second position $P_{P2}$, the first control port 28 is in fluid communication with the fluid return port 26 while the second control port 30 is in fluid communication with the fluid inlet port 24.

As a proportional valve, the axial position of the pilot stage spool valve 18 in the bore of the housing 20 controls the amount of fluid that passes through the pilot stage valve assembly 12. The pilot stage valve assembly 12 includes an electronic actuator 32 that is adapted to axially move the pilot stage spool valve 18 in the bore of the housing 20 between the neutral position $P_{PN}$ and the first and second positions $P_{P1}$, $P_{P2}$. In one aspect of the present disclosure, the electronic actuator 32 is a voice coil.

The electronic actuator 32 is actuated in response to an electronic signal 34 (shown as a dashed lined in FIG. 1) received from a microprocessor 36. In one aspect of the present disclosure, the microprocessor 36 provides the electronic signal 34 in response to various input signals.

The first and second control ports 28, 30 of the pilot stage valve assembly 12 are in fluid communication with the middle stage valve assembly 14. In one aspect of the present disclosure, the middle stage valve assembly 14 is a three-position, four-way proportional valve. In another aspect of the present disclosure, the middle stage valve assembly 14 is a two-position, two-way proportional valve.

The middle stage valve assembly 14 includes a middle stage spool valve 40 and a housing 42. The middle stage spool valve 40 is disposed in a bore of the housing 42 such that the middle stage spool valve 40 is axially slidable in the bore of the housing 42.

The middle stage spool valve 40 includes a first axial end 44 and an oppositely disposed second axial end 46. A first spring 48*a* acts on the first axial end 44 of the middle stage spool valve 40 while a second spring 48*b* acts on the second axial end 46. The first and second springs 48*a*, 48*b* are adapted to center the middle stage spool valve 40 in the bore of the housing 42.

The axial position of the middle stage spool valve 40 in the bore of the housing 42 is controlled by fluid pressure acting on one of the first and second axial ends 44, 46. In one aspect of the present disclosure, the first control port 28 of the pilot stage valve assembly 12 is in fluid communication with the first axial end 44 of the middle stage spool valve 40 while the second control port 30 of the pilot stage valve assembly 12 is in fluid communication with the second axial end 46.

The middle stage valve assembly 14 further includes a position sensor 50. In one aspect of the present disclosure, the position sensor 50 is a linear variable displacement transducer (LVDT). The position sensor 50 senses the position of the middle stage spool valve 40 in the bore of the housing 42. The position sensor 50 sends a signal 52 to the microprocessor 36, which uses the positional data from the position sensor 50 to actuate the electronic actuator 32 of the pilot stage valve assembly 12. The positions of the middle stage valve assembly 14 will be described in greater detail subsequently.

In one aspect of the present disclosure, the middle stage valve assembly 14 is in selective fluid communication with the first main stage valve assembly 16*a*. In another aspect of the present disclosure, the middle stage valve assembly 14 is in selective fluid communication with the first main stage valve assembly 16*a* and a second main stage valve assembly 16*b*, where the second main stage valve assembly 16*b* is substantially similar in structure to the first main stage valve assembly 16*a*. For ease of description purposes, the second main stage valve assembly 16*b* will not be separately described herein as the second main stage valve assembly 16*b* is substantially similar in structure to the first main stage valve assembly 16*a*.

Figure 2:
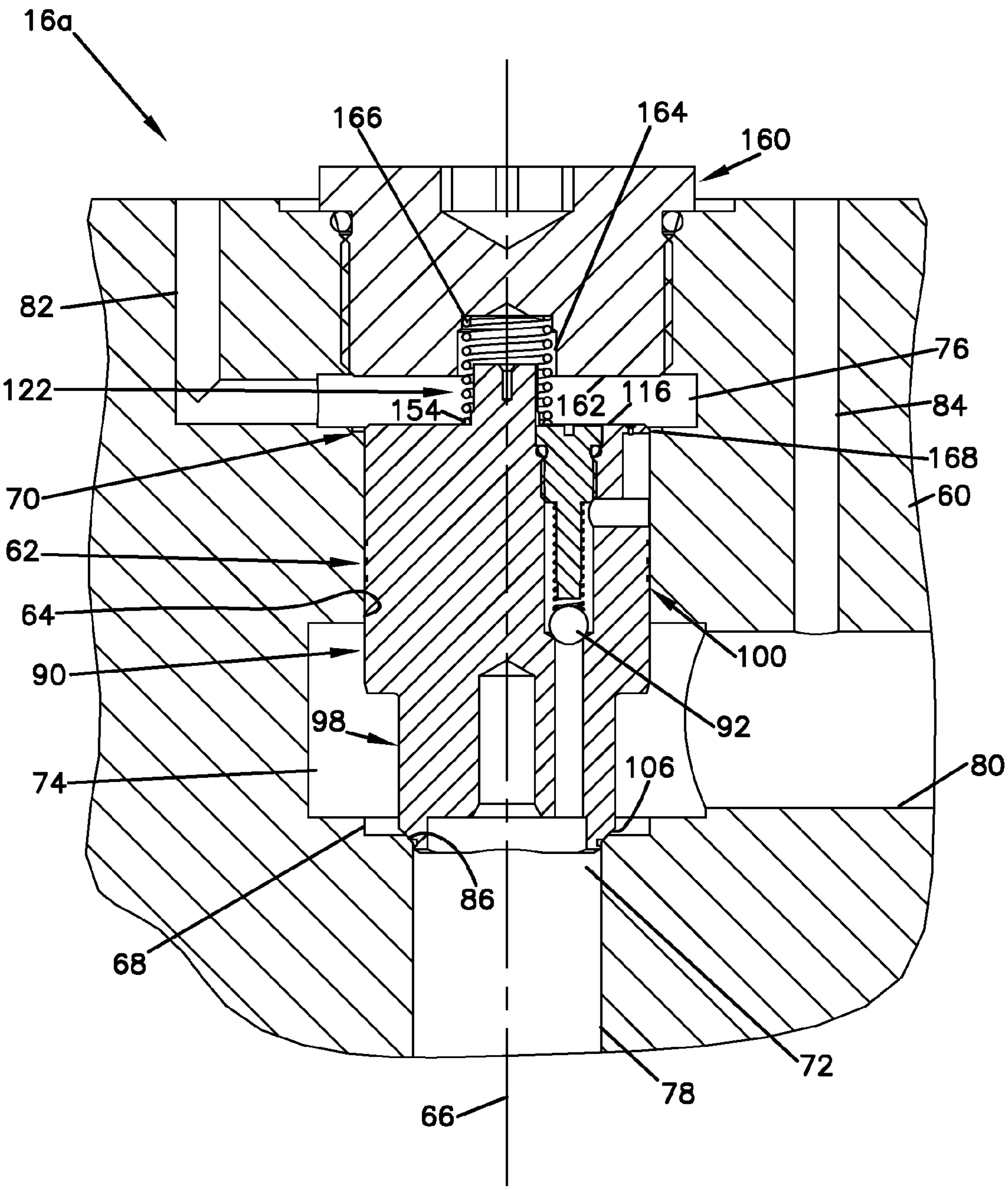
FIG. 2 is a fragmentary cross-sectional view of a main stage valve assembly suitable for use in the valve assembly of FIG. 1.
Figure 3:
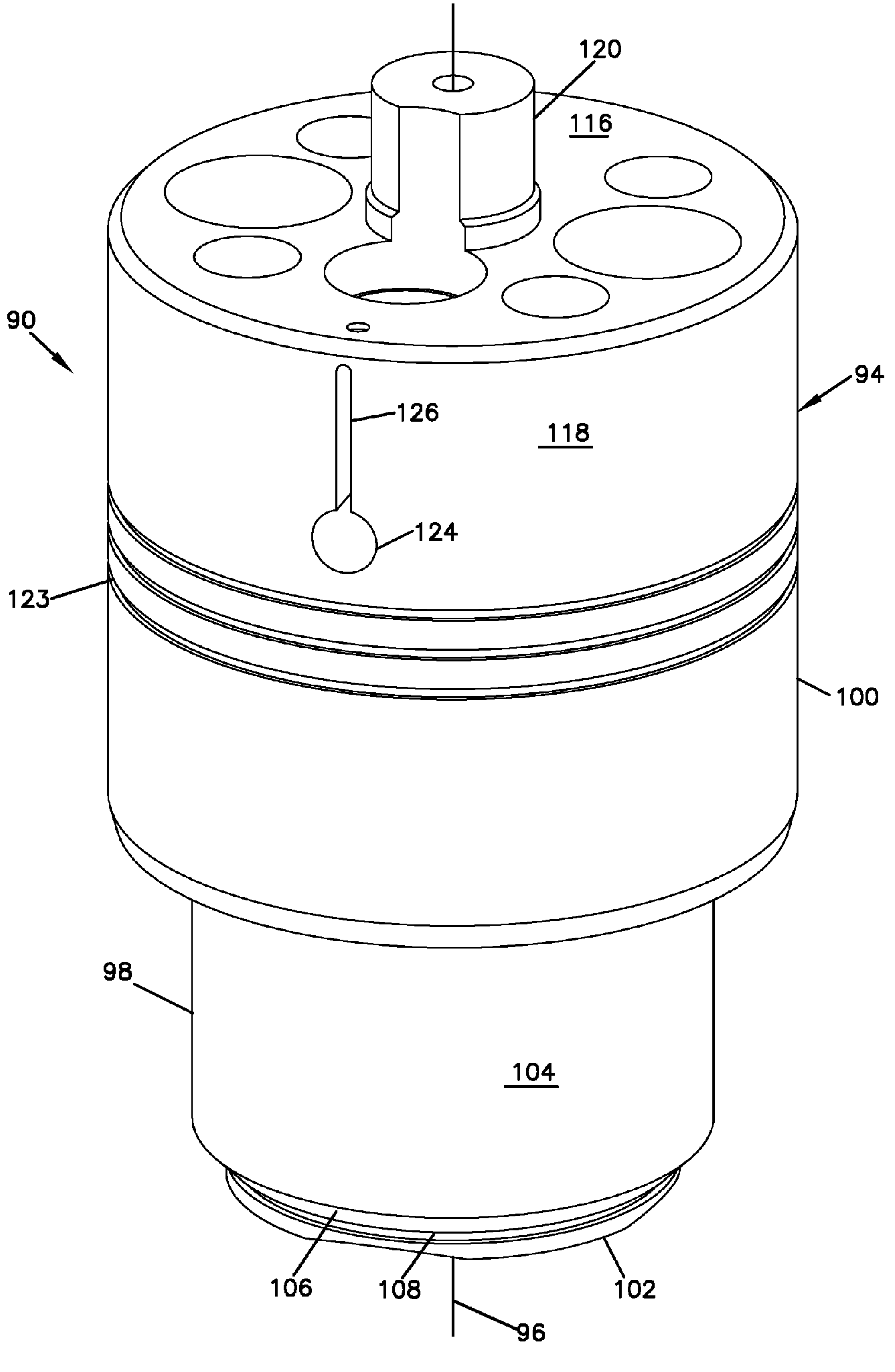
FIG. 3 is an isometric view of a poppet valve suitable for use with the main stage valve assembly of FIG. 2.
Figure 4:
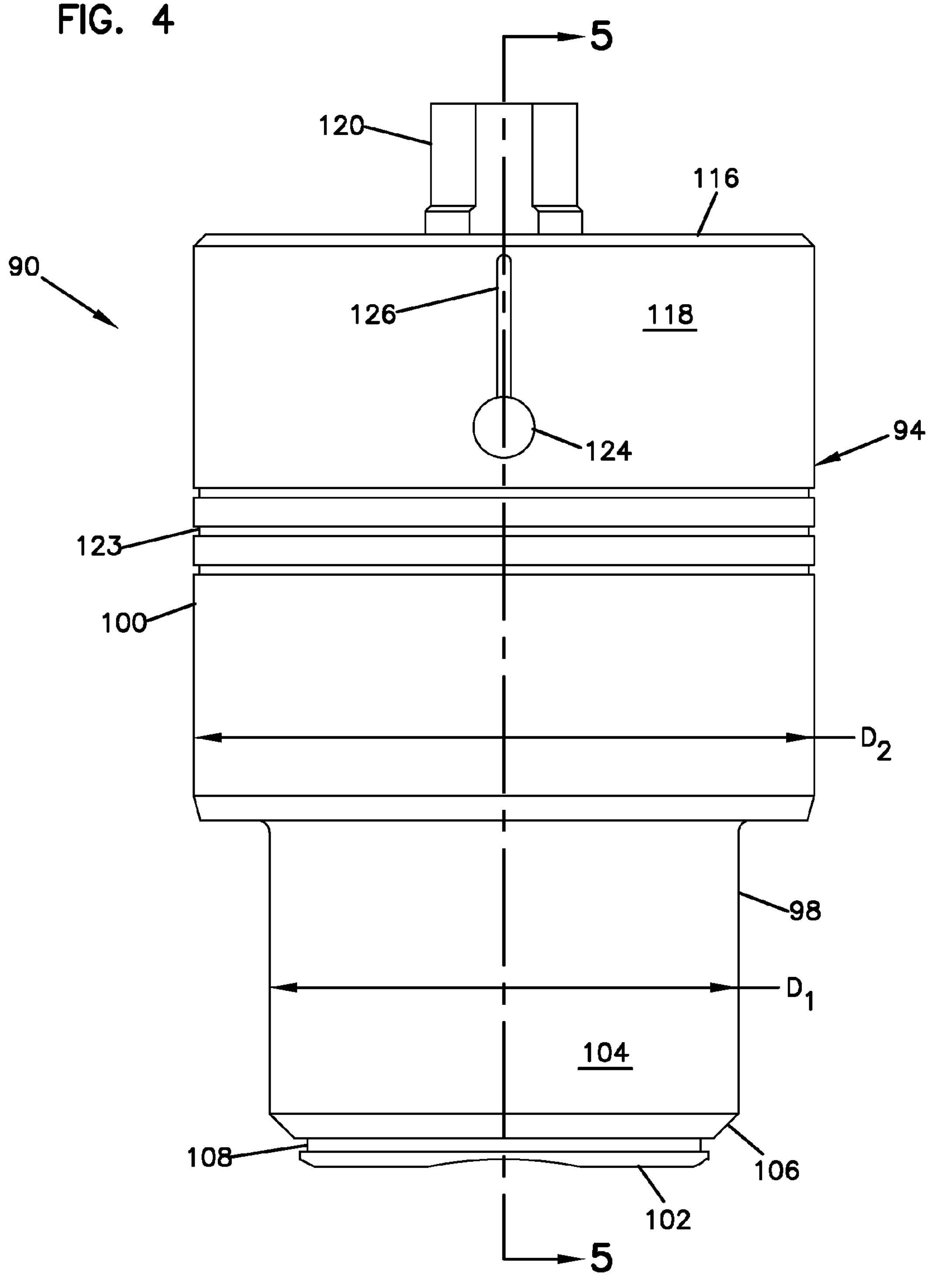
FIG. 4 is a side view of the poppet valve of FIG. 3.
Figure 5:
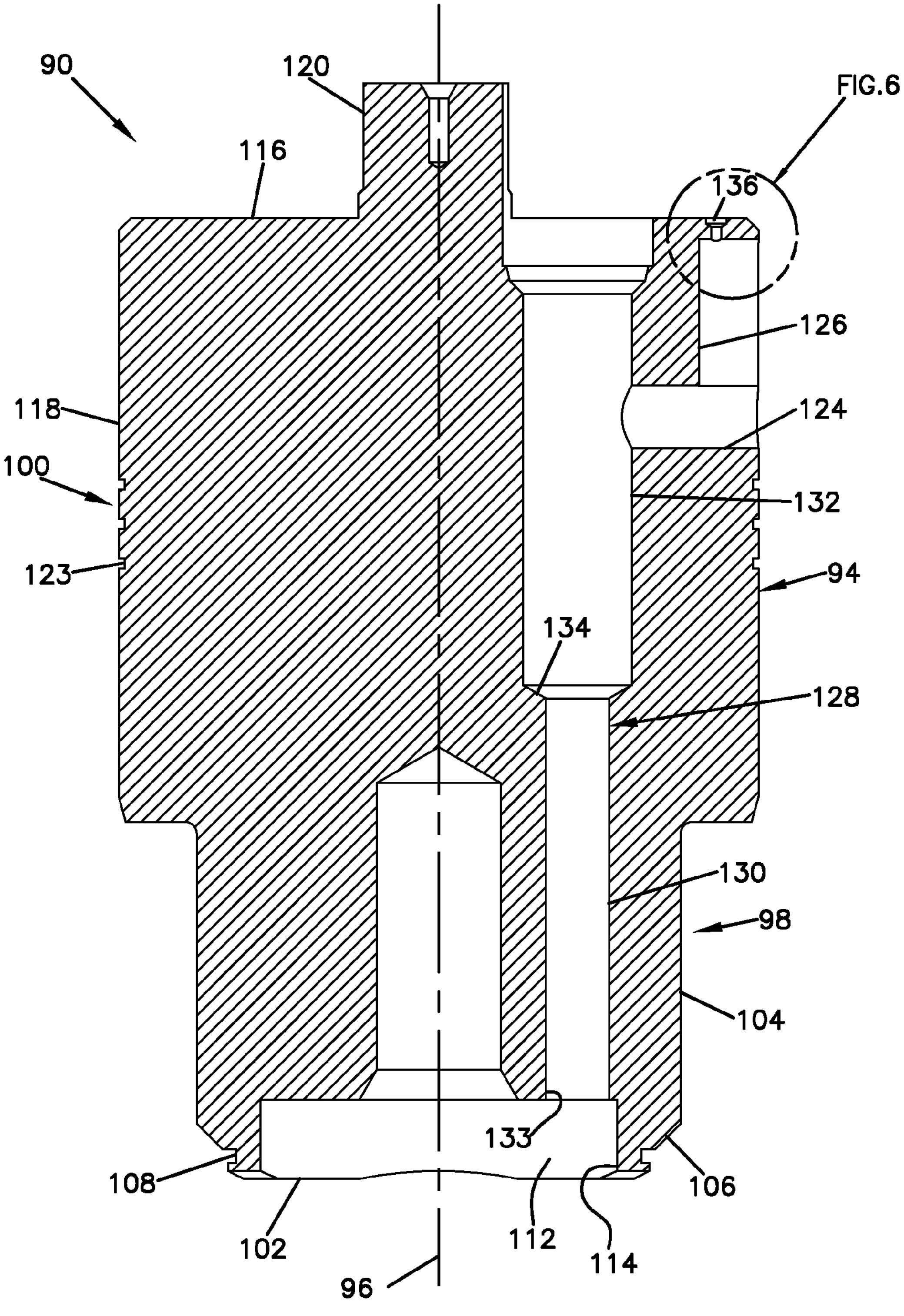
FIG. 5 is a cross-sectional view of the poppet valve taken on line 5-5 of FIG. 4.

Referring now to FIGS. 1 and 2, the first main stage valve assembly 16*a* will be described. The first main stage valve assembly 16*a* includes a valve housing 60 and a poppet valve assembly, generally designated 62.

The valve housing 60 defines a valve bore 64 having a central longitudinal axis 66. The valve bore 64 is adapted to receive the poppet valve assembly 62. The poppet valve assembly 62 is adapted to move in an axial direction in the valve bore 64 along the central longitudinal axis 66.

The valve bore 64 includes a first end portion 68 and an oppositely disposed second end portion 70. The valve bore 64 defines a first cavity 72, a second cavity 74 and a load holding cavity 76. The first cavity 72 is disposed at the first end portion 68 of the valve bore 64. The second cavity 74 is disposed between the first and second end portions 68, 70. The load holding cavity 76 is disposed at the second end portion 70.

The valve housing 60 further defines a first fluid passage 78 in fluid communication with the first cavity 72 of the valve bore 64, a second fluid passage 80 in fluid communication with the second cavity 74 of the valve bore 64 and a third fluid passage 82 in fluid communication with the load holding cavity 76 of the valve bore 64. The valve housing 60 further defines a fourth fluid passage 84. The fourth fluid passage 84 is in fluid communication with the second fluid passage 80 and in selective fluid communication with the third fluid passage 82 through the middle stage valve assembly 14. In one aspect of the present disclosure, the first fluid passage 78 is an inlet fluid passage while the second fluid passage 80 is an outlet fluid passage.

The valve bore 64 includes a valve seat 86. The valve seat 86 is disposed at the first end portion 68 of the valve bore 64. In one aspect of the present disclosure, the valve seat 86 is disposed at the intersection of the first fluid passage 78 and the valve bore 64.

The valve seat 86 of the valve bore 64 is adapted for selective sealing engagement with the poppet valve 60. In one aspect of the present disclosure, the valve seat 86 is tapered such that the valve seat 86 includes an inner diameter that decreases as the distance along the central longitudinal axis 66 from the valve seat 86 to the second end portion 70 increases. In another aspect of the present disclosure, the valve seat 86 is generally frusto-conical in shape.

The poppet valve assembly 62 includes a poppet valve, generally designated 90, and a check valve 92. In one aspect of the present disclosure, the check valve 92 is disposed in the poppet valve 90.

Referring now to FIGS. 3-6, the poppet valve 90 is shown. The poppet valve 90 includes a body, generally designated 94, having a central longitudinal axis 96 that extends through the center of the body 94. The body 94 includes a first axial end portion 98 and an oppositely disposed second axial end portion 100. In one aspect of the present disclosure, the first axial end portion 98 has an outer diameter $D_1$ that is less than an outer diameter $D_2$ of the second axial end portion 100.

The first axial end portion 98 includes a first end surface 102 and a first circumferential surface 104. The first circumferential surface 104 is generally cylindrical in shape. In one aspect of the present disclosure, the first circumferential surface 104 includes a tapered surface 106. The tapered surface 106 is adapted for selective sealing engagement with the valve seat 86 of the valve bore 64. The tapered surface 106 is disposed adjacent to the first end surface 102. The tapered surface 106 is generally frusto-conical in shape and has an outer diameter that increases as the axial distance from the first end surface 102 to the tapered surface 106 increases.

In one aspect of the present disclosure, the first axial end portion 98 defines a circumferential groove 108. In the depicted embodiment of FIGS. 1-6, the circumferential groove 108 is disposed between the first end surface 102 and the tapered surface 106. In one aspect of the present disclosure, the circumferential groove 108 improves the grindability of the tapered surface 106 during the manufacturing process of the poppet valve 90.

In another aspect of the present disclosure, the first axial end portion 98 further defines a cavity 112. The cavity 112 includes an opening 114 in the first end surface 102.

The second axial end portion 100 includes a second end surface 116 and a second circumferential surface 118. In one aspect of the present disclosure, the second end surface 116 includes a spring guide 120. The spring guide 120 is generally cylindrical in shape and extends outwardly from a central location on the second end surface 116. An outer diameter of the spring guide 120 is sized to be smaller than an inner diameter of a spring 122 (best shown in FIG. 2) such that the spring guide 120 fits within a portion of the inner diameter of the spring 122. In one aspect of the present disclosure, the spring 122 is a coil spring.

The second circumferential surface 118 is generally cylindrical in shape. In one aspect of the present disclosure, the second circumferential surface 118 defines a plurality of grooves 123. In the depicted embodiment, there are three grooves 123 defined by the second circumferential surface 118. The grooves 123 extend around the second circumferential surface 118 and are adapted to pressure balance the poppet valve 90 in the valve bore 64.

The second circumferential surface 118 defines a hole 124 that extends into the body 94 from the second circumferential surface 118 in a radial direction. The second circumferential surface 118 further defines a metering slot 126 that extends outwardly in an axial direction from the hole 124 toward the second end surface 116.

The body 94 of the poppet valve 90 defines a passage 128. The passage 128 is adapted to provide fluid communication between the first fluid passage 78 and the load holding cavity 76. As will be described in greater detail subsequently, the flow through the passage 128 and the flow through the middle stage valve assembly 14 cooperatively determine the axial position of the poppet valve assembly 62 in the valve bore 64 of the housing 60.

The passage 128 extends in a generally longitudinal direction through the first and second end surfaces 102, 116. In one aspect of the present disclosure, the passage 128 is generally parallel to the central longitudinal axis 96 of the body 94. In another aspect of the present disclosure, the passage 128 is offset from the central longitudinal axis 96 of the body 94. In another aspect of the present disclosure, the passage 128 is generally aligned with the central longitudinal axis 96 of the body 94.

The passage 128 includes a first portion 130 and a second portion 132. The first portion 130 includes an opening 133 defined by the first end surface 102 and extends into the body 94 of the poppet valve 90 in a first longitudinal direction from the cavity 112 of the first axial end portion 98 while the second portion 132 extends into the body 94 in an opposite second longitudinal direction from the second end surface 116. In one aspect of the present disclosure, the first and second portions 130, 132 are aligned.

The first portion 130 includes an inner diameter that is less than an inner diameter of the second portion 132. The first and second portions 130, 132 of the passage 128 cooperatively define a check valve seat 134. The check valve seat 134 is adapted for selective sealing engagement with the check valve 92, which is adapted to provide one-way flow through the passage 128. In one aspect of the present disclosure, the check valve seat 134 includes a generally frusto-conical surface that has an inner diameter that decreases as a distance from the second end surface 116 increases. In another aspect of the present disclosure, the check valve seat 134 is generally perpendicular to a longitudinal axis that extends through the passage 128.

The first portion 130 of the passage 128 is in fluid communication with the cavity 112. The second portion 132 of the passage 128 is in fluid communication with the metering slot 126. In one aspect of the present disclosure, the fluid communication between the metering slot 126 and the second portion 132 of the passage 128 is established through the hole 124, which extends from the second circumferential surface 118 to the second portion 132 of the passage 128.

Figure 6:
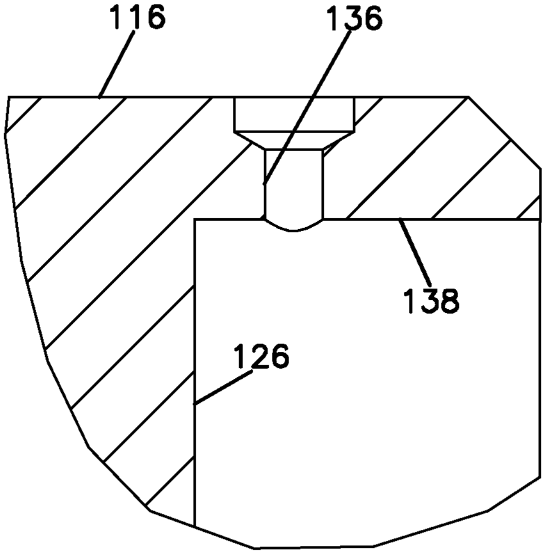
FIG. 6 is an enlarged fragmentary view of an orifice of the poppet valve of FIG. 3.

Referring now to FIG. 6, the poppet valve 90 further defines an orifice 136. The orifice 136 extends through the second end surface 116 and through an axial end 138 of the metering slot 126. An inner diameter of the orifice 136 is adapted to provide limited fluid communication between the metering slot 126 and the load holding cavity 76 when the poppet valve assembly 62 is in a seated position (shown in FIGS. 1 and 2).

Figure 7:
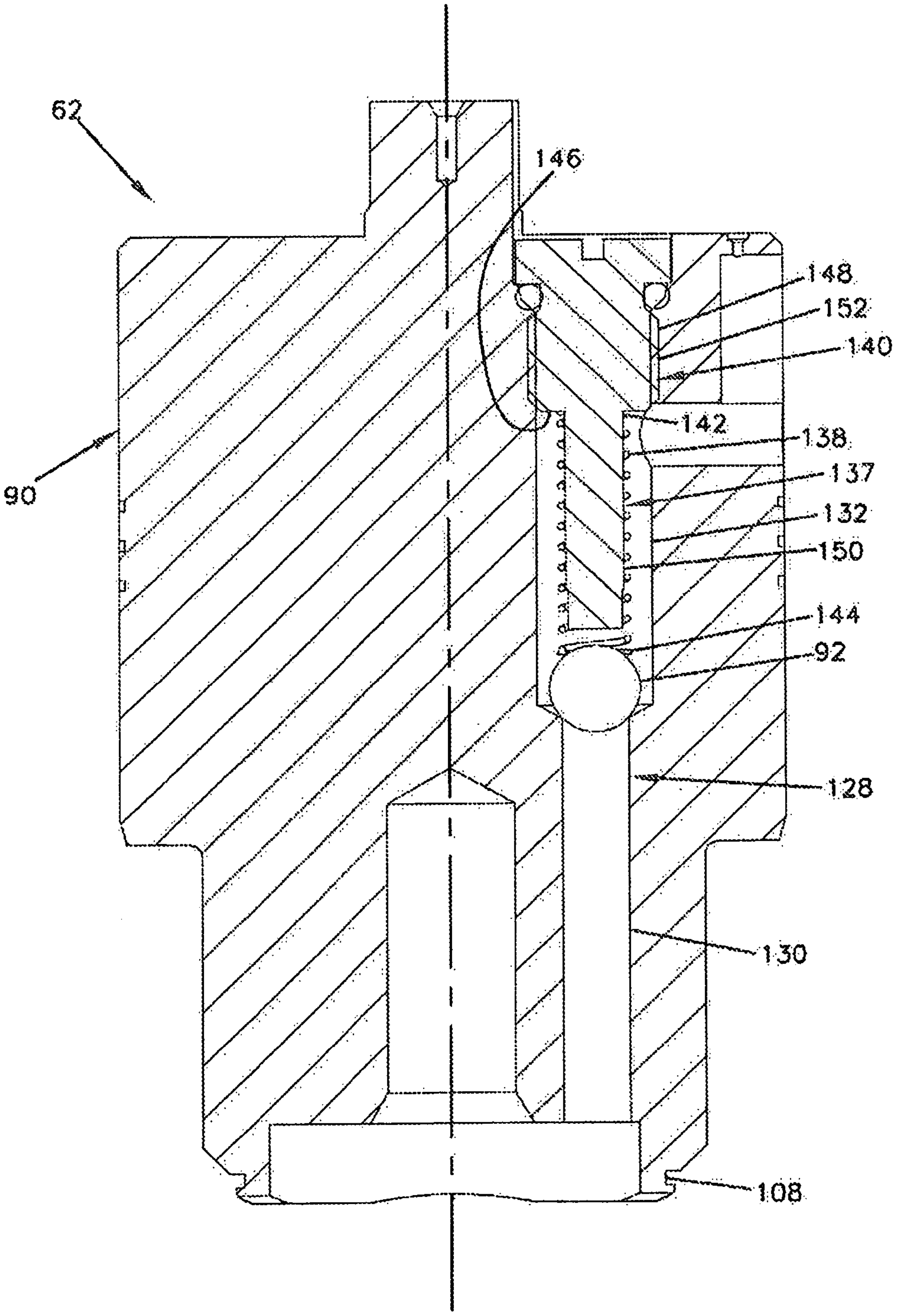
FIG. 7 is a cross-sectional view of a poppet valve assembly suitable for use with the main stage valve assembly of FIG. 2.

Referring now to FIG. 7, the assembly of the poppet valve assembly 62 will be described. The check valve 92 is disposed in the second portion 132 of the passage 128. A plug assembly 137 is then inserted into the second portion 132 of the passage 128. The plug assembly 137 includes a spring 138 and a plug 140.

The spring 138 includes a first end 142 and an oppositely disposed second end 144. The first end 142 of the spring 138 engages a spring seat 146 on the plug 140 while the second end 144 engages the check valve 92. The disposition of the spring 138 between the plug 140 and the check valve 92 biases the check valve 92 into the check valve seat 134.

The plug 140 of the plug assembly 137 includes a first axial portion 148 and a second axial portion 150. The first axial portion 148 includes the spring seat 146 and defines a plurality of external threads on an outer circumferential surface 152. The external threads of the first axial portion 148 are adapted for engagement with a plurality of internal threads defined by the second portion 132 of the passage 128.

The second axial portion 150 extends outwardly from the first axial portion 148. An outer diameter of the second axial portion 150 is less than an outer diameter of the first axial portion 148 and is less than the inner diameter of the spring 138. The second axial portion 150 is adapted to prevent the check valve 92 from moving too great a distance from the check valve seat 134.

The plug 140 is inserted into the passage 128 such that the spring 138 circumferentially surrounds the second axial portion 150 of the plug 140. The plug 140 is tightened into the second portion 132 of the passage 128.

Referring now to FIG. 2, the assembly of the first main stage valve assembly **16*a* will be described. The poppet valve assembly 62 is inserted into the valve bore 64 of the housing 60 so that the first axial end portion 98 of the poppet valve 90 is disposed in the first end portion 68 of the valve bore 64 of the housing 60 and the second axial end portion 100 of the poppet valve 90 is disposed in the second end portion 70 of the valve bore 64**.

With the poppet valve assembly 62 disposed in the valve bore 64, the spring 122 is inserted into the second end portion 70 of the valve bore 64. The spring 122 is inserted so that a first end 154 of the spring 122 abuts the second end surface 116 of the second axial end portion 100 of the poppet valve 90 while the inner diameter of the spring 122 circumferentially surrounds the spring guide 120 of the second axial end portion 100 of the poppet valve 90.

An end plug 160 in then inserted into the second end portion 70 of the valve bore 64 of the housing. The end plug 160 includes an axial end 162. The axial end 162 defines a spring cavity 164. The spring cavity 164 is adapted to receive a second end 166 of the spring 122.

In one aspect of the present disclosure, the end plug 160 includes a plurality of external threads. The external threads are adapted for threaded engagement with a plurality of internal threads defined by the second end portion 70 of the valve bore 64. As the end plug 160 is threaded into the second end portion 70 of the valve bore 64, the spring 122 compresses between the second axial end portion 100 of the poppet valve 90 and the end plug 160. This compression of the spring 122 between the second axial end portion 100 of the poppet valve 90 and the end plug 160 biases the poppet valve 90 into the valve seat 86.

Referring now to FIG. 1, the middle stage valve assembly 14 includes a neutral position $P_{MN}$, a first position $P_{M1}$, and a second position $P_{M2}$. In the neutral position $P_{MN}$, the middle stage valve assembly 14 is adapted to selectively block fluid communication between the load holding cavity 76 of the poppet valve assembly 16 and the second fluid passage 80 of the poppet valve assembly 16. With fluid communication between the load holding cavity 76 and the second fluid passage 80 blocked, the poppet valve assembly 62 is hydraulically locked in a seated position in which the tapered surface 106 is seated against the valve seat 86. With the tapered surface 106 seated against the valve seat 86, the fluid communication between the first fluid passage 78 and the second fluid passage 80 is blocked.

In the first position $P_{M1}$, the middle stage valve assembly 14 is adapted to provide fluid communication between the load holding cavity 76 and the second fluid passage 80 of the first main stage valve assembly 16*a*. In this position, the poppet valve assembly 62 can move axially in the valve bore 64. If the flow through the passage 128 is less than the flow through the middle stage valve assembly 14, the tapered surface 106 of the poppet valve assembly 62 moves in a first axial direction away from the valve seat 86 causing a clearance between the tapered surface 106 and the valve seat 86. As this clearance increases, the amount of fluid communicated between the first fluid passage 78 and the second fluid passage 80 increases. If the flow through the passage 128 is equal to the flow through the middle stage valve assembly 14, the axial position of the poppet valve assembly 64 is held at a constant axial position. If the flow through the passage 128 is greater than the flow through the middle stage valve assembly 14, the poppet valve assembly 62 moves in a second axial direction toward the valve seat 86 causing the clearance between the tapered surface 106 and the valve seat 86 to decrease. As this clearance decreases, the amount of fluid communicated between the first fluid passage 78 and the second fluid passage 80 decreases.

The amount of flow through the passage 128 is governed primarily by the size of an opening created between the metering orifice 126 and a recess 168 in the second end portion 70 of the valve bore 64. As the opening between the metering orifice 126 and the recess 168 increases, the amount of flow through the passage 128 increases. In the seated state, the metering orifice 126 of the poppet valve 90 is completely covered by the valve bore 64. In this situation, fluid can flow through the passage 128 into the load holding cavity 76 through the orifice 136 until the opening between the metering orifice 126 and the recess 168 is present.

In one aspect of the present disclosure, the middle stage valve assembly 14 is a proportional valve assembly. As a result, the amount of fluid that flows through the middle stage valve assembly 14 is proportional to the axial position of the middle stage spool valve 40 in the bore of the housing 42. As the middle stage spool valve 40 moves closer to the first position $P_{M1}$, the amount of fluid that passes through the middle stage valve assembly 14 increases.

In the second position $P_{M2}$, the middle stage valve assembly 14 is in fluid communication with a load holding cavity and second fluid passage of the second main stage valve assembly 16*b* while fluid communication between the load holding cavity 76 and the second fluid passage 80 of the first main stage valve assembly 16*a* is blocked. As the second main stage valve assembly 16*b* is similar in structure to the first main stage valve assembly 16*a*, the operation of the middle stage valve assembly 14 in the second position $P_{M2}$ is similar to the operation of the middle stage valve assembly 14 in the first position $P_{M1}$.

Referring now to FIGS. 1-7, the operation of the valve assembly 10 will be described. In response to an input signal and the signal 52 from the positional sensor 50, the microcontroller 36 sends an electronic signal 34 to the electronic actuator 32 of the pilot stage valve assembly 12. In the present scenario, the pilot stage valve assembly 12 is actuated to the second position $P_{P2}$. In the second position $P_{P2}$, the second control port 30 of the pilot stage valve assembly 12 is in fluid communication with the fluid inlet port 24 while the first control port 28 is in fluid communication with the fluid return port 26.

With the pilot stage valve assembly 12 in the second position $P_{P2}$, fluid passes through the pilot stage valve assembly 12 to the second axial end 46 of the middle stage spool valve 40 while any fluid acting on the first axial end 44 of the middle stage spool valve 40 is drained. The fluid acting on the second axial end 46 of the middle stage spool valve 40 causes the middle stage valve assembly 14 to shift toward a first position $P_{M1}$.

With the middle stage valve assembly 14 shifting toward the first position $P_{M1}$, the load holding cavity 76 of the poppet valve assembly 16 is in fluid communication with the second fluid passage 80. With the load holding cavity 76 of the poppet valve assembly 16 in fluid communication with the second fluid passage 80, fluid pressure acting on the first end surface 102 of the poppet valve 90 moves the poppet valve 90 along the central longitudinal axis 66 such that the tapered surface 106 of the poppet valve 90 is disengaged or unseated from the valve seat 86 of the valve bore 64. With the poppet valve 90 unseated from the valve seat 86, fluid communication is established between the first fluid passage 78 and the second fluid passage 80.

In another scenario, the pilot stage valve assembly 12 is positioned in the neutral position $P_{PN}$. In the neutral position $P_{PN}$, fluid is drained from each of the first and second axial ends 44, 46 of the middle stage spool valve 40 so that the middle stage valve assembly 14 is disposed in the neutral position $P_{MN}$. As previously provided, with the middle stage valve assembly 14 in the neutral position $P_{MN}$, the poppet valve assembly 62 is hydraulically locked in the seated position thereby blocking fluid communication between the first and second fluid passages 78, 80.

The check valve 92, which is integrally disposed in the body 94 of the poppet valve 90, allows for one-way fluid communication between the first fluid passage 78 and the load holding cavity 76. In one aspect of the present disclosure, the check valve 92 prevents fluid from being communicated in a direction from the load holding cavity 76 to the first fluid passage 78. The check valve 92 is adapted to prevent leakage through the passage 128. Leakage flowing in the direction from the load holding cavity 76 to the first fluid passage 78 can result in the poppet valve assembly 62 being inadvertently unseated from the valve seat 86 while the middle stage valve assembly 14 is in the neutral position $P_{MN}$.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A poppet valve assembly comprising:

a body including a first axial end portion and a second axial end portion, the first axial end portion having a tapered surface adapted for sealing engagement with a valve seat, the second axial end portion including a circumferential surface defining an axially extending metering slot, the second axial end portion including a spring guide that extends outwardly from an end surface along a central longitudinal axis of the body, the body defining a passage that includes an opening in the first axial end portion and is in fluid communication with the metering slot, the passage including a check valve seat;

a check valve disposed in the passage, the check valve being laterally offset from the central longitudinal axis, the check valve being adapted to sealingly engage the check valve seat; and a valve housing defining a valve bore in which the body is received, the valve housing defining the valve seat, the metering slot cooperating with the valve housing to define a metering opening at the second axial end portion of the body when the body is offset from the valve seat, the metering opening being completely closed when the body is seated on the valve seat, the metering opening allowing fluid to pass therethrough when the body is offset from the valve seat, the body defining a fixed size orifice that extends from an end of the metering slot to the end surface of the second axial end portion of the body, and the check valve being configured to allow fluid to flow through the passage from the check valve seat toward the metering slot and the fixed size orifice and to prevent fluid from flowing through the passage from the metering slot and the fixed orifice toward the check valve seat.

2. The poppet valve assembly of claim 1, further comprising a plug assembly disposed in the passage, the plug assembly including a plug and a spring that interacts with the check valve, wherein the spring guide defines an axially extending notch to accommodate the plug.

3. The poppet valve assembly of claim 1, wherein the passage is offset from a central longitudinal axis of the body.

4. The poppet valve assembly of claim 1, wherein the check valve is biased into engagement with the check valve seat by a spring.

5. The poppet valve assembly of claim 1, wherein the tapered surface is frusto-conical in shape.

6. A valve assembly comprising:

a main stage valve assembly including:

a housing defining:

a first fluid passage;

a second fluid passage;

a valve bore having a valve seat, the valve bore being in fluid communication with the first and second fluid passages, wherein the valve seat is disposed in the valve bore between the first and second fluid passages;

a load holding cavity in selective fluid communication with the second fluid passage;

a poppet valve assembly disposed in the valve bore, the poppet valve assembly including:

a poppet valve being adapted for engagement with the valve seat, the poppet valve being configured to move within the valve bore along a first axis, the poppet valve having a body defining a passage through the body, the passage including a check valve seat, the passage providing fluid communication between the first fluid passage and the load holding cavity; and a check valve assembly disposed in the passage of the poppet valve, the check valve assembly including a check valve, a valve plug, and a valve spring, the valve plug includes an axial portion about which the valve spring is disposed so that the valve spring extends from the valve plug to the check valve, the check valve being adapted to move within the passage along a second axis that is laterally offset from the first axis, the check valve being adapted to reduce leakage through the passage in a direction from the load holding cavity to the first fluid passage.

7. The valve assembly of claim 6, wherein the passage includes a first portion that is in fluid communication with the first fluid passage and a second portion that is in fluid communication with the second fluid passage, the first portion having an inner diameter that is less than an inner diameter of the second portion.

8. The valve assembly of claim 6, wherein the passage is generally offset from a central longitudinal axis of the body of the poppet valve.

9. The valve assembly of claim 6, wherein the body of the poppet valve includes a first axial end portion and an oppositely disposed second axial end portion, the first axial end portion being adapted for engaging the valve seat, the second axial end portion defining a metering orifice in fluid communication with the passage.

10. The valve assembly of claim 6, further comprising a middle stage valve assembly in fluid communication with the poppet valve assembly, the middle stage valve assembly being adapted to provide fluid communication between the load holding cavity and the second fluid passage.

11. The valve assembly of claim 10, wherein the middle stage valve assembly is a four-way, three-position proportional valve.

12. The valve assembly of claim 6, wherein the first fluid passage is an inlet fluid passage and the second fluid passage is an outlet fluid passage.

13. A valve assembly comprising:

a pilot stage valve assembly;

a middle stage valve assembly in fluid communication with the pilot stage valve assembly;

a main stage valve assembly in fluid communication with the middle stage valve assembly, the main stage valve assembly including:

a housing defining:

an inlet fluid passage;

an outlet fluid passage;

a valve bore having a valve seat, the valve bore being in fluid communication with the inlet and outlet fluid passages, wherein the valve seat is disposed in the valve bore between the inlet and outlet fluid passages;

a load holding cavity, wherein the middle stage valve assembly provides fluid communication between the load holding cavity and the outlet fluid passage;

a poppet valve assembly disposed in the valve bore, the poppet valve assembly including:

a poppet valve being adapted for engagement with the valve seat, the poppet valve having a body defining a passage adapted to provide fluid communication between the inlet fluid passage and the load holding cavity through the body, the passage including a check valve seat, the passage extending along an axis through the body from a first end of the body to an opposite end of the body, the axis being offset from a central axis of the body; and a check valve assembly disposed in the passage of the poppet valve, the check valve assembly including a check valve, a valve plug, and a valve spring, the valve plug includes an axial portion about which the valve spring is disposed so that the valve spring extends from the valve plug to the check valve, the check valve being adapted to reduce leakage through the passage in a direction from the load holding cavity to the inlet fluid passage.

14. The valve assembly of claim 13, wherein the pilot stage valve assembly includes an electronic actuator.

15. The valve assembly of claim 14, wherein the electronic actuator is a voice coil.

16. The valve assembly of claim 13, wherein pilot stage valve assembly provides fluid to at least one end of a middle stage spool valve of the middle stage valve assembly to actuate the middle stage valve assembly.

17. The valve assembly of claim 13, wherein the body of the poppet valve includes a first axial end portion and an oppositely disposed second axial end portion, the first axial end portion being adapted for engaging the valve seat, the second axial end portion defining a metering orifice in fluid communication with the passage.

18. The valve assembly of claim 13, wherein the passage is offset from a central longitudinal axis of the body.

19. A valve assembly comprising:

a main stage valve assembly including:

a housing defining:

a first fluid passage;

a second fluid passage;

a valve bore having a valve seat, the valve bore being in fluid communication with the first and second fluid passages, wherein the valve seat is disposed in the valve bore between the first and second fluid passages;

a load holding cavity in selective fluid communication with the second fluid passage;

an end plug disposed within the valve bore;

a poppet valve assembly disposed in the valve bore, the poppet valve assembly including:

a poppet valve including a body having a first central axis that extends between a first end of the body and a second end of the body, the poppet valve being configured to move along the first central axis relative to the valve bore, the body defining a tapered surface at the first end and defining a metering orifice at a position between the first and second ends, the tapered surface being adapted for sealing engagement with a valve seat;

the body defining a passage adapted to provide fluid communication between the first fluid passage and the load holding cavity through the body, the passage including a check valve seat, the body including a spring guide extending upwardly from the second end of the body, the spring guide extending along the first central axis, the spring guide defining an axially extending notch;

a spring disposed around the spring guide so that the spring extends along the first central axis, the spring having one end abutting the second end of the body and another end abutting the end plug, the spring enabling the poppet valve to move along the first central axis; and a check valve assembly disposed in the passage, the check valve assembly including a check valve, a valve plug, and a valve spring, the check valve being adapted to sealingly engage the check valve seat, the valve plug having a portion that fits in the axially extending notch defined in the spring guide, the valve spring being laterally offset from the spring and enabling the check valve to move along a second central axis of the valve plug, the second central axis being laterally offset from the first central axis, and the second central axis being parallel to the first central axis and to the axial notch defined in the spring guide.

20. The poppet valve assembly of claim 1, wherein the passage extends from a bottom end surface of the body to a top end surface of the body, and wherein a cross-hole provides fluid communication between the passage and the metering slot.

21. The poppet valve assembly of claim 1, wherein the passage is parallel to the central longitudinal axis of the body.

22. A valve assembly comprising:

a valve housing defining a valve bore, a fluid inlet passage, a fluid outlet passage, a first cavity and a second cavity, the first cavity providing fluid communication between the fluid inlet passage and the fluid outlet passage and the second cavity is a load holding cavity, the valve housing also at least partially defining a flow path that extends from the load holding cavity to the fluid outlet passage, the valve housing also including a valve seat positioned adjacent to the first cavity;

a proportional flow valve positioned along the flow path for controlling a rate of flow through the flow path between the load holding cavity and the outlet passage, the proportional flow valve also having a neutral position where the flow path is blocked by the proportional flow valve;

a valve body positioned within the valve bore, the valve body having a first axial end and a second axial end, the valve body being axially movable within the valve bore to a seated position in which the first axial end of the valve body seats on the valve seat to block fluid communication between the inlet and outlet passages though the first cavity, the valve body being axially movable within the valve bore to unseat the first axial end of the valve body from the valve seat to allow fluid communication between the inlet and outlet passages through the first cavity, the second axial end of the valve body being exposed to fluid within the load holding cavity;

the valve body defining a valve through-path arrangement that extends through the valve body to provide fluid communication between the inlet passage and the load holding cavity, the valve through-path arrangement including a metering slot having an open side positioned at a circumferential surface of the valve body, the metering slot cooperating with the valve housing to define a metering opening that provides fluid communication between the valve through-path and the load holding cavity when the valve body is unseated from the seated position, the metering opening is completely blocked when the valve body is in the seated position, the valve through-path arrangement also including a fixed size orifice that is in constant fluid communication with the load holding cavity regardless of whether the valve body is seated on the valve seat or unseated from the valve seat;

a spring for biasing the valve body to the seated position; and a check valve positioned within the valve body, the check-valve being configured to allow flow through the valve through-path arrangement from the inlet passage to the load holding cavity and to prevent flow through the valve through-path arrangement from the load holding cavity to the inlet passage, a seat of the check valve being positioned at an intermediate location along the valve through-path arrangement, and the fixed size orifice being positioned between the valve seat and the load holding cavity.

23. The valve assembly of claim 22, wherein the fixed orifice is located between an end of the metering slot and the load holding cavity.

24. The valve assembly of claim 22, wherein the valve through-passage arrangement includes a portion aligned along an axis that is offset from a longitudinal axis of the valve body.

* * * * *